United States Patent [19]

Kikuchi

[11] Patent Number: 5,418,443

[45] Date of Patent: May 23, 1995

[54] MOTOR DRIVING CIRCUIT

[75] Inventor: Akihiro Kikuchi, Chiba, Japan

[73] Assignee: Sony Corporation, Tokyo, Japan

[21] Appl. No.: 667,482

[22] Filed: Mar. 11, 1991

[30] Foreign Application Priority Data

Mar. 13, 1990 [JP] Japan .................... 2-61866

[51] Int. Cl.⁶ ............................................. H02P 5/28
[52] U.S. Cl. .................... 318/807; 318/685;
318/696; 318/569; 318/600; 388/507.5
[58] Field of Search ............... 318/867, 685, 696, 569,
318/600; 388/907.5

[56] References Cited

U.S. PATENT DOCUMENTS

| | | | |
|---|---|---|---|
| 4,647,760 | 3/1987 | Bardwell | 318/807 |
| 4,926,104 | 5/1990 | King et al. | 318/807 |
| 5,252,905 | 10/1993 | Wills et al. | 318/807 |

Primary Examiner—William M. Shoop, Jr.
Assistant Examiner—Karen Masih
Attorney, Agent, or Firm—William S. Frommer; Alvin Sinderbrand

[57] ABSTRACT

In a motor driving circuit for generating sine wave signals for driving a focusing step motor in a video camera or the like, sine wave data stored in a ROM are accessed in response to an address signal generated by an address generator. A desired sine wave frequency is set by bit-shifting the address signal supplied from the address generator. The address generator counts horizontal sync pulses in which, prior to counting, a predetermined number of the sync pulses are removed at substantially equal intervals so that the counted number of pulses per frame is equal to a power product of 2. The order in which the sine wave data are accessed is inverted every quarter frame period, and the sine wave data read out of the ROM in a vertical period in the order established by the inverter device are processed so as to form sine wave signals having respective phases for supply to the step motor. Sine wave data having a relatively large amplitude are read out from the ROM at the start of the rotation of the step motor so as to obtain a predetermined torque, and, after the step motor has started rotating, sine wave data having a smaller amplitude are read out so as to reduce the power consumption.

11 Claims, 11 Drawing Sheets

0°–90° OUTPUT

90°–180° OUTPUT

180°–270° OUTPUT

270°–360° OUTPUT

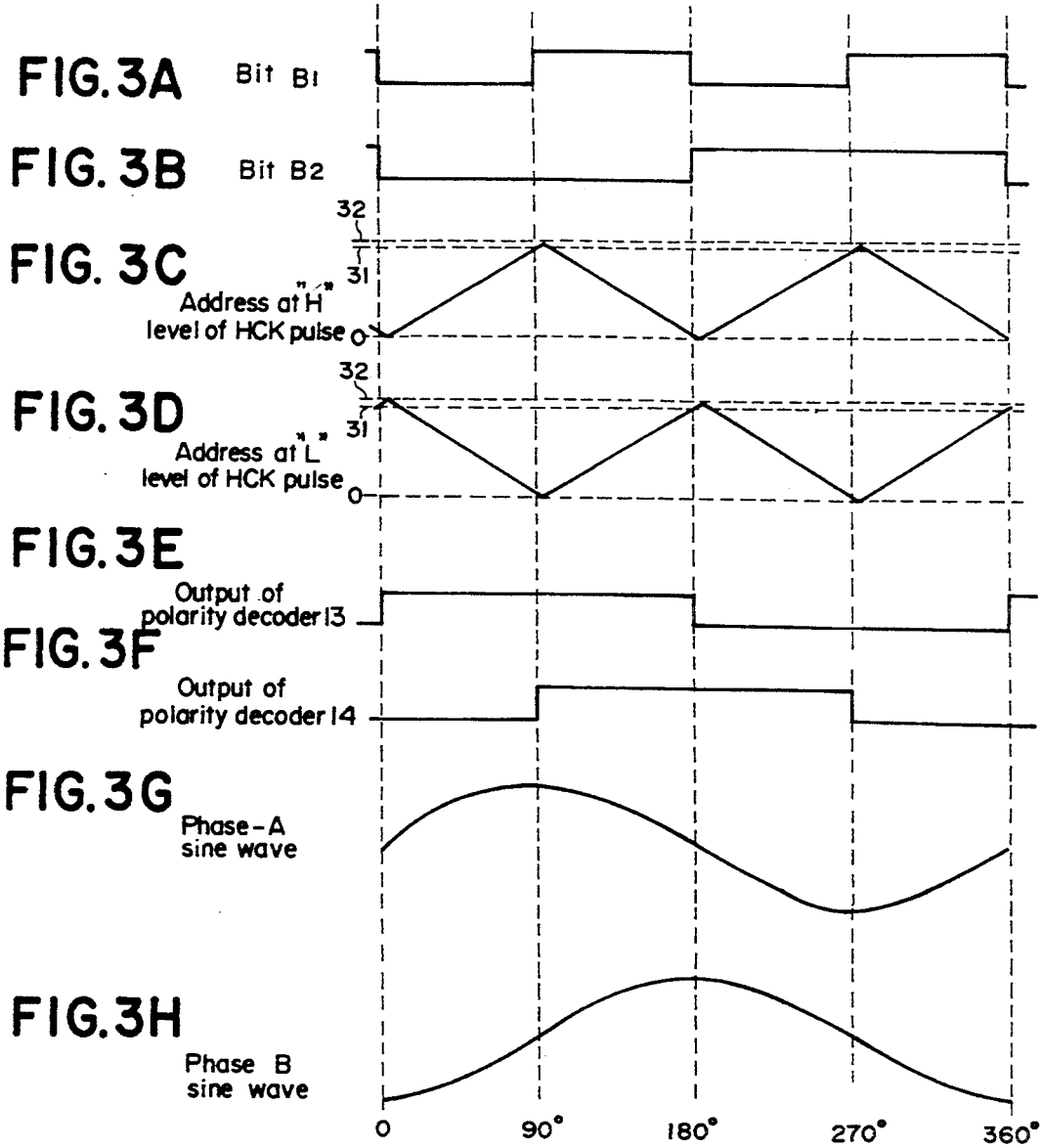

MOTOR DRIVING CIRCUIT

BACKGROUND OF THE INVENTION

1. Field of the Invention

The present invention relates to a motor driving circuit for driving a video-camera focusing motor or the like.

2. Description of the Prior Art

Due to its relatively high control precision, a step motor is typically employed as a focusing motor for controlling the position of a focus lens in a video camera. Such step motor is driven generally by square waves. However, in driving a step motor by square waves, a problem arises in that the rotation of the motor may be rendered discontinuous with the occurrence of vibration and noise. In an attempt to absorb such vibration, an impedance roller or the like is usually employed. However, such means for eliminating or absorbing vibration may have limited results and may be an impediment to having a compact and lightweight structure.

In view of the above-described problems, the present inventor previously proposed that a step motor for effecting focus control be driven by sine waves. If a step motor is driven by sine waves, the rotation thereof is rendered relatively smooth thus reducing both vibration and noise, thereby eliminating the necessity of any mechanical countermeasure. As a result, a more compact and lightweight structure can be achieved. Furthermore, power consumption can be reduced by driving a step motor with sine waves.

When a step motor is driven by square waves, the motor may be reliably stopped at a detent position as, for example, illustrated in FIG. 14, in which the center of an excited pole 151A of a rotor 151 is opposed to the center of an excited pole 152A of a stator 152, however, on the other hand, when the step motor is driven by sine waves, the motor may not always be stopped at a detent position. If the step motor fails to stop at a detent position, a problem may arise in that, when the motor is started again, the rotation may be rendered nonsmooth which may cause an error.

The frequency of square waves may be changed by means of a frequency dividing counter or the like. However, in the case of sine waves, it is not easy to set a desired frequency.

Sine waves for driving a step motor can be produced by storing sine wave data in a read only memory (ROM), then supplying a predetermined clock signal to a counter to generate an address, and reading out the desired data from the ROM in accordance with the address obtained from the counter. As an example, consider the situation in which focus control is executed on the basis of the auto-focus control data received in every vertical period. In this situation, a step motor is driven by sine waves synchronized with the vertical period. Such sine waves can be generated by feeding horizontal sync pulses as a clock signal to a counter and then supplying the relevant address obtained from the counter to the ROM where the sine wave data are stored.

When a $2^n$ counter is employed for generating an address in the manner described above, a desired frequency is settable by bit shifting. As an example, a 1-bit shift, corresponding to a count of 1, may be executed in a $2^n$ counter with 2 clock pulses. The address to the ROM is then advanced stepwise at a speed of $\frac{1}{2}$ so as to change the frequency to $\frac{1}{2}$.

However, in the NTSC system for example, there are 525 horizontal sync pulses per frame. Since 525 is not a power product of 2, it is not impossible to employ a $2^n$ counter for generating an address in this system.

In producing sine waves, it is customary in the prior art to store 1 frame of sine wave data in a ROM in a manner as previously mentioned. However, such storage of 1-frame of sine wave data increases the required capacity of the ROM.

Furthermore, to drive a step motor, multi-phase signals of mutually different phases are normally utilized. As a result, when forming two-phase sine waves for example, two groups of ROMs and address generators are utilized, thereby increasing the required amount of hardware.

Further, while a step motor typically requires a relatively large torque at the start of its rotation, such a large torque is not normally needed thereafter while the motor is rotating. Thus, it may be considered to increase the amplitude of the motor driving signal at the start of rotation and thereafter to decrease the amplitude so as to reduce the power consumption.

As previously described, when a step motor is driven by sine waves, the motor may not always stop exactly at a detent position. Further, if the amplitude of the motor driving signal is changed at any time other than when the motor is at a detent position, the motor rotation may not be smooth.

OBJECTS AND SUMMARY OF THE INVENTION

Accordingly, it is an object of the present invention to provide a motor driving circuit which avoids the above-mentioned disadvantages of the prior art.

More specifically, it is an object of the present invention to provide a motor driving circuit in which a predetermined frame amount of sine waves are generated in a vertical period such that, when data are received, the step motor can be stopped at a detent position thereof and, such that the motor rotation is relatively smooth with relatively high-precision control.

It is another object of the present invention to provide a motor driving circuit which is capable of changing the driving sine-wave frequency.

It is yet a further object of the present invention to provide a motor driving circuit in which the number of horizontal sync pulses counted, for example, in one frame, is made equal to a power product of 2, so that an address signal for accessing a desired address can be generated from a $2^n$ counter.

It is still a further object of the present invention to provide a motor driving circuit which reduces the required memory capacity of a ROM utilized for storing sine wave data, thereby reducing the size and amount of the hardware.

Yet another object of the present invention is to provide a motor driving circuit in which the amplitude of the sine wave driving signals is set to a relatively low value during the rotation of the step motor so as to reduce the power consumption, and in which the amplitude is selectively switched at a detent position so as to provide smooth rotation of the motor with relatively high-precision control.

According to an aspect of the present invention, the step motor driving circuit of the memory means for storing sine wave data at respective addresses therein;

address generator means generating an address signal having a plurality of bits for accessing corresponding ones of said addresses in the memory means for a predetermined amount of a frame in a vertical period; bit shifter means bit-shifting the address signal from the address generator means for setting a desired frequency; and means for reading the sine wave data stored at the accessed addresses in the memory means and for processing the read sine wave data so as to form the sine wave driving signals having the desired frequency for supply to the step motor so as to drive the same.

In a video camera having the above-described motor driving circuit, a focusing step motor, driven by sine waves, is stopped every vertical period, and auto-focus control is executed while receiving an auto-focus (AF) detection signal in every vertical period. More specifically, sine wave data are stored in a ROM, and a desired address is generated from a counter. In response to a signal from a pulse removal device, an address represented by a power product of 2 is generated per frame from the counter. Sine waves for a predetermined amount of frames are read out from the ROM in accordance with such address. As a result, when AF detection data are received in synchronism with the vertical period, the step motor can be stopped at a detent position. Since the $2^n$ address is generated per frame from the counter, a desired driving sine-wave frequency can be set by bit-shifting the output of the counter by means of a multiplexer.

According to another aspect of the present invention, the step motor driving circuit of the present invention comprises input means for receiving a predetermined number of horizontal sync pulses in each of a succession of frame periods; memory means for storing sine wave data at respective addresses therein; pulse removal means for removing a predetermined number of the horizontal sync pulses at substantially equal intervals during each of the frame periods so that the remaining number of the horizontal sync pulses per frame becomes a power product of 2; address generator means counting the remaining number of horizontal sync pulses for accessing corresponding ones of the addresses in the memory means; and means for reading the sine wave data stored at the accessed addresses in the memory means and for processing the read sine wave data so as to form the sine wave signals for supply to the step motor so as to drive the same.

In the NTSC system, for example, there are typically 525 horizontal sync pulses per frame. To set the number of such pulses of each frame to 512, 13 (525−512=13) horizontal sync pulses are removed therefrom.

In a $2^n$ counter whose bit output is a power product of 2, a count value may be removed every power product of 2. As a result, since the power product of 2 closest to 13 is 16 ($2^5$=16), 1 pulse may be removed every 32 pulses so as to achieve substantially uniform removal of 16 from the 525 pulses.

However, as is to be appreciated, when 16 pulses are removed by selectively removing 1 pulse per 32 pulses from the 525 pulses, 3 pulses too many are removed since the number of pulses to be removed is only 13. Thus 3 pulses need not be removed. The procedure by which this is accomplished is described below.

More specifically, the power product of 2 which is closest to and at least equal to 3 is 4. Therefore, one out of four operations, in which each operation removes 1 pulse per 32 pulses, is not performed. As is to be appreciated, 1 pulse still needs to be removed. To correct this situation, a pulse removal operation is performed in one of the four previously described operations which were not to be performed.

Thus, 13 pulses are removed from 525 pulses in a substantially uniformed manner.

According to yet another aspect of the present invention, the memory for storing sine wave data corresponding to input means for receiving a predetermined number of clock pulses in each of a succession of frame periods; memory means for storing sine wave data at respective addresses therein corresponding to a quarter frame period; address generator means counting the predetermined number of the clock pulses for accessing in a predetermined order corresponding ones of the addresses in the memory means; inverter means for inverting the order in which the corresponding ones of the addresses are accessed each of the quarter periods; and means for reading the sine wave data stored at the accessed addresses in the memory means in the order set forth by the inverter means and for processing the read sine wave data so as to form the sine wave signals for supply to the step motor so as to drive the same.

In a modification of the above-described circuit, the state of the inverter is switched every quarter period while being selectively switched between a relatively high-level duration of the clock pulse and a relatively low-level duration thereof to produce two-phase sine waves having mutually different phases.

More specifically, sine wave data representing a phase angle span of 90° may be stored in a ROM. As a result sine waves ranging from 0° to 90° can be obtained by feeding forward stepping addresses to the ROM, while sine wave form 90° to 180° can be obtained by feeding reverse stepping addresses to the ROM. Further, sine waves ranging from 180° to 270° can be obtained by feeding forward stepping addresses to the ROM, then sequentially reading out the sine wave data therefrom, and inverting the polarity of the sine wave data read out. Furthermore, sine waves ranging from 270° to 360° can be obtained by feeding reverse stepping addresses to the ROM, then sequentially reading out the sine wave data therefrom, and inverting the polarity of the sine wave data read out.

In the inverter, the stepping direction of the addresses is inverted every 90°, so that 1 frame of sine waves are generated from the sine wave data representing a phase angle span of 90°, thus allowing the memory capacity of the ROM to be reduced.

In addition, if the state of the inverter is switched between the relatively high-level duration of the clock pulses and the relatively low-level duration thereof, two-phase sine waves of mutually different phases are produced in a time division mode, thereby reducing the needed hardware.

According to still another aspect of the present invention, the memory means for storing a plurality of sine wave data having respective amplitudes in respective addresses therein; address generator means for accessing corresponding ones of the addresses in the memory means; and means for reading the sine wave data stored at the accessed addresses in the memory means and for processing the read sine wave data so as to form the sine wave signals for supply to the step motor so as to drive the same, in which the sine wave data having a relatively large amplitude is read out from the memory means at the start of rotation of the step motor and, after the step motor has started rotating, the sine wave data having a smaller amplitude is read out from the memory means when a predetermined phase angle of the sine wave data is obtained.

Four data tables, for example, maybe prepared in the ROM, for respectively storing therein sine wave data having mutually different amplitudes. The tables in the ROM are selectively switched in response to a switching signal obtained from a terminal, so that the amplitudes of the sine waves may be switched as desired. Such operation of switching the amplitudes of the sine waves is performed when the focusing step motor is at a detent position, thereby maintaining a relatively smooth rotation of the motor.

The above, and other objects features and advantages of the present invention, will become more apparent from the following detailed description of the preferred embodiment of the present invention when read in conjunction with the accompanying drawings in which corresponding parts are identified by the same reference numerals.

BRIEF DESCRIPTION OF THE DRAWINGS

FIGS. 3A to 3H illustrate timing charts to which reference will be made in explaining the operation of the embodiment of the present invention;

DESCRIPTION OF THE PREFERRED EMBODIMENT

The preferred embodiment of the present invention will now be described in detail with reference to the accompanying drawings.

Sine Wave Driver

Figure 1:
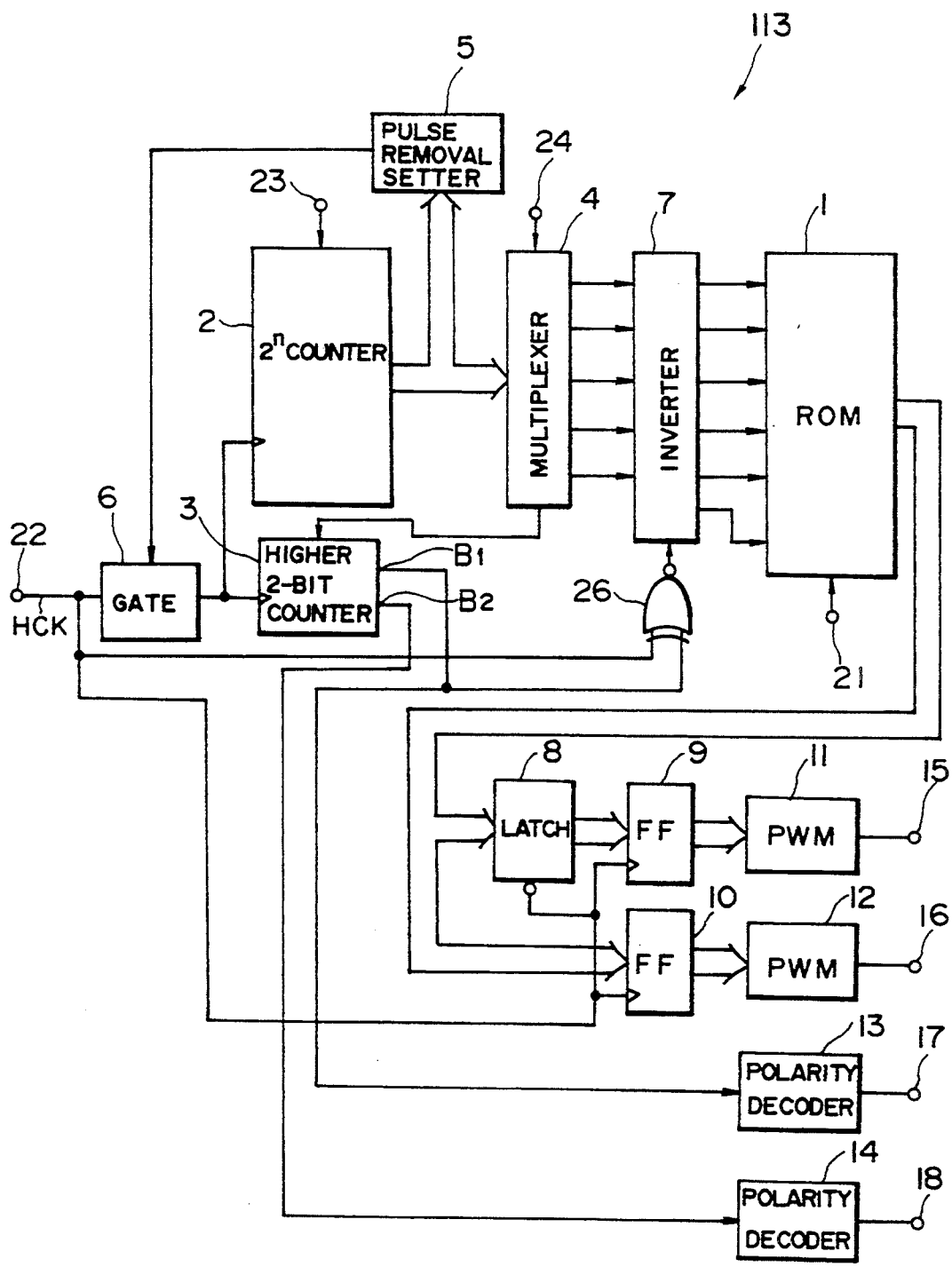
FIG. 1 is a block diagram of a motor driving circuit embodiment of the present invention.
Figure 2:
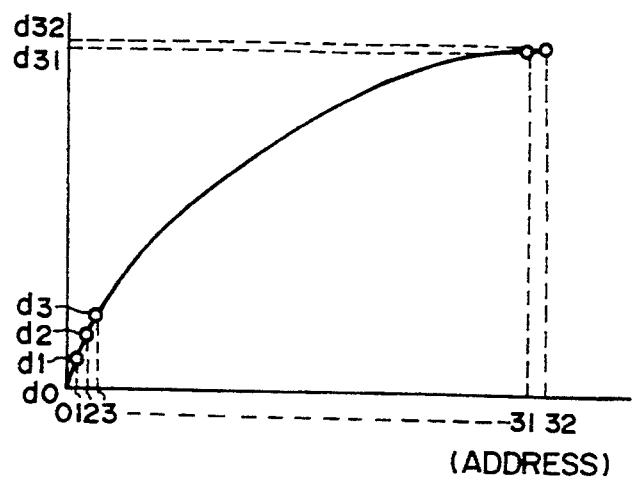
FIG. 2 is a schematic diagram illustrating data to be stored in a ROM.

FIG. 1, illustrates a sine wave driver 113 having a ROM (read only memory) 1 which is adapted for storing sine wave data. As an example, four data tables may be prepared in the ROM 1, in which sine wave data having mutually different amplitudes ranging from 0° to 90° in phase angle are stored in each of the tables in a manner as shown in FIG. 2. Each data table has a predetermined capacity which, for example, may be $(2^5+1)$ bits so as to provide selections from 0 to 32. The tables in the ROM 1 are selected by a switching signal supplied from a terminal 21. The switching of the tables in the ROM 1 occurs when the associated step motor is in a detent position. More specifically, a table having relatively large amplitude values is selected at the start of the step motor rotation, and thereafter, upon the rotation of the step motor, a table having smaller amplitude values is selected. The tables in the ROM 1 may be switched at a detent position by using the output of a higher 2-bit counter 3.

More specifically, a signal indicating an address of the ROM 1 is generated by a counter 2. The address signal is supplied to the ROM 1 via a multiplexer 4 and an inverter 7. The counter 2 may include a $2^n$ counter having a 9-bit combination. The counter 2 is advanced in a stepwise manner as, for example, from step 0 to step 512 by horizontal sync clock pulses (HCK) which are supplied to the counter from a gate circuit 6. As will be more fully described later, a pulse removal setter 5 removes some of the horizontal sync pulses of 1 frame pulses in the NTSC system) in such a manner that the counted value becomes equal to a power product of 2. As an example, consider the NTSC system which utilizes 525 horizontal sync pulses per frame. In this example, 13 pulses would be removed by the pulse removal setter 5 so as to leave $2^9$ or 512 pulses. The counter 2 receives a clear signal from a terminal 23. The clear signal is supplied when the step motor is in a detent position.

The higher 2-bit counter 3 is supplied with a carry from the $2^n$ counter selected by the multiplexer 4. The higher 2-bit counter 3 generates polarity data in accordance with the phase angle ranges 0°–90°, 90°–180°, 180°–270°, and 270°–360°. For example, as shown in FIG. 3A, the output B1 of the higher 2-bit counter 3 may become "0" during a phase angle range of 0°–90°, "1" during 90°–180°, "0" during 180°–270°, and "1" during 270°–360°. In a similar manner, the other output B2 of the higher 2-bit counter 3 may become "0" during a phase angle range of 0°–180° and "1" during 180°–360°.

The output of the $2^n$ counter 2 is supplied to the multiplexer 4 and the pulse removal setter 5. The multiplexer 4 is further supplied with a selection signal from a terminal 24. The output of the $2^n$ counter 2 is bit-shifted by the multiplexer 4 in accordance with the selection signal, so as to set the frequency of the sine waves to be generated from the counted 9 bits of the counter 2, 5 bits are selected and outputted from the multiplexer 4.

The pulse removal setter 5 removes some of the clock pulses HCK at substantially at equal intervals such that 1 frame of output of the $2^n$ counter 2 becomes a power product of 2. As previously described, in the NTSC system, for example, having 525 pulses, 13 pulses are removed so as to leave 512 or $2^9$ pulses. To remove the clock pulses HCK, the gate circuit 6 is closed in response to the output of the pulse removal setter 5.

The inverter 7 is adapted to invert the addresses every 90° so as to produce a stepping motion. As a result sine waves for 1 frame can be formed from the 90° sine wave data stored in the ROM 1.

Figure 4A:
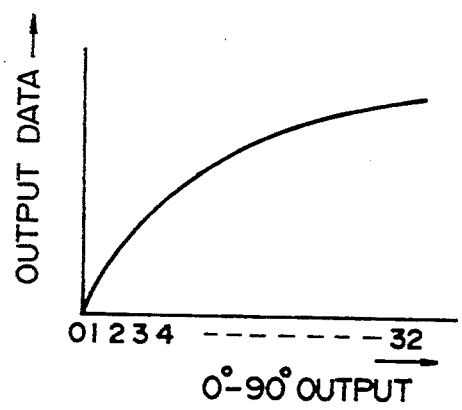
FIGS. 4A through 4D are schematic diagrams to which reference will be made in explaining the embodiment of the present invention.
Figure 4B:
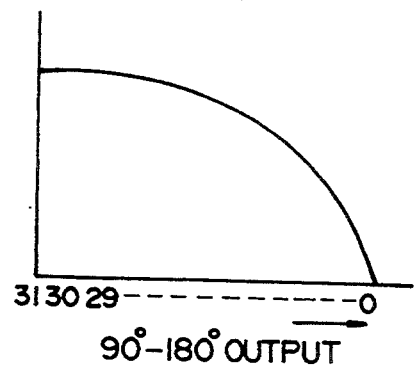
Figure 4C:
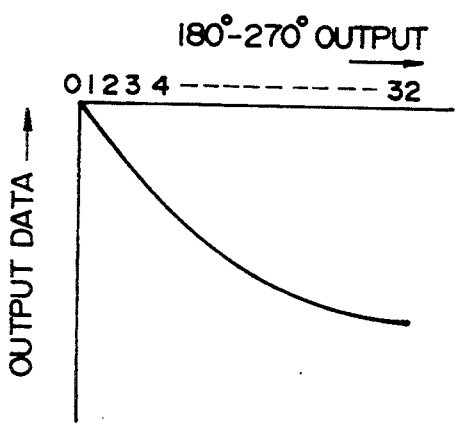
Figure 4D:
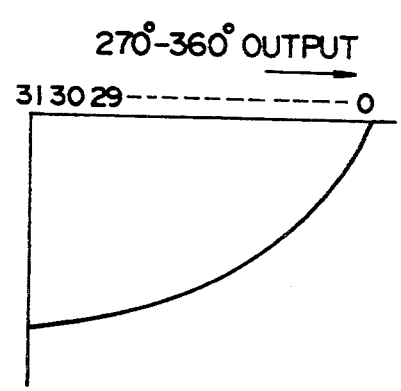

More specifically, 90° sine wave data d0, d1, d2, d3, . . . and so forth, are respectively stored in addresses 0, 1, 2, 3, . . . and so forth, in the ROM 1 as shown in FIG. 2. If forward stepping addresses 0, 1, 2, 3, . . . and so forth, are supplied to the ROM 1 as shown in FIG. 4A, the corresponding respective sine wave data d0, d1, d2, d3, . . . are sequentially read out therefrom so as to obtain a partial sine wave, that is, from 0°–90°. If reverse stepping addresses 31, 30, 29, . . . and so forth are supplied to the ROM 1 as shown in FIG. 4B, the corresponding respective sine wave data d31, d30, d29, . . . are sequentially read out therefrom so as to obtain a partial sine wave, that is, from 90°–180°. Similarly, a partial sine wave from 180°–270° may be obtained by supplying forward stepping addresses 0, 1, 2, 3, . . . and so forth, to the ROM 1, then reading out the corresponding respective sine wave data d0, d1, d2, d3, . . . sequentially therefrom and inverting the polarity of such read-out sine wave data as shown in FIG. 4C. Likewise, a partial sine wave from 270°–360° may be obtained by supplying reverse stepping addresses 31, 30, 29, . . . and so forth to the ROM 1, then reading out the corresponding respective sine wave data d31, d30, d29, . . . sequentially therefrom and inverting the polarity of such read-out sine wave data as shown in FIG. 4D.

The reverse stepping addresses can be formed by taking the respective 2's complements of the addresses. More specifically, forward stepping addresses 1, 2, 3, . . . and so forth, can be formed by sequentially advancing a 5-bit address, that is, 00001, 00010, 00011 . . . and so forth, respectively. Taking the 2's complements of such addresses produces the reverse stepping addresses 31, 30, 29 . . . and so forth, that is, 11111, 11110, 11101 . . . , respectively.

The counter 2 is reset to 0 upon arriving at the maximum value. However, in the case in which reverse stepping addresses are formed by taking the 2's complements thereof every 90°, as previously described, a problem may arise. More specifically, the 2's complement of "00000" is "00000". As a result, when the counter is reset to the address 0 ("00000") after the maximum sine wave data has been read out upon arriving at the address 31 ("11111"), the minimum sine wave data is read out. Thereafter, the counted value is "00001", and the address obtained by taking a 2's complement thereof is 31 ("11111"), whereupon the maximum sine wave data is read out. Consequently, the sine wave data thus read out are rendered discontinuous.

In view of the above problem, an address 32 ("100000"), in which the maximum value of the sine wave data may be stored, is utilized in a preferred embodiment of the present invention. More specifically, a carry is generated when the counter is reset to 0 ("00000") upon arriving at a value of 31 ("11111"). However, in this situation, the address 32 ("100000") is selected instead of the address 0 ("00000"), whereby the maximum value is read out from the ROM 1.

Alternatively, the above-described procedure may be modified such that the address bits are inverted without taking the 2's complement thereof. In this case, the address 32 is not necessary.

In FIG. 1, an inverting signal is supplied from an EX-NOR gate 26 to the inverter 7 and to the ROM 1. When the inverting signal is "1", for example, the address stepping direction is inverted or reversed. On the other hand, when the inverting signal is "0", the address stepping direction is in a forward stepping direction.

The output B1 of the higher 2-bit counter 3 is supplied to one input terminal of the EX-NOR gate 26, and a clock signal HCK from an input terminal 22 is supplied to the other input terminal of the EX-NOR gate 26. As a result, of the output B1 of the higher 2-bit counter 3 being switched every 90° as shown in FIG. 3A, the address stepping direction is inverted every 90° by the inverter 7.

As previously mentioned, the clock signal HCK is supplied to the EX-NOR gate 26. As a result, the state of the inverter 7 is switched between the high-level time of the clock signal HCK and the low-level time. Accordingly, sine waves of mutually different phases can be obtained by controlling the inverter 7 through the use of the clock signal which is divided into two alternating levels.

More specifically, FIGS. 3C and 3D show the addresses supplied to the ROM 1 when the clock signal HCK is at a high level and a low level respectively. In the range of 0°–90°, the output B1 (FIG. 3A) of the higher 2-bit counter 3 is "0" and, as a result, the output of the EX-NOR gate 26 becomes is "0" during the high-level time of the clock signal HCK. Therefore, in the range of 0°–90°, forward stepping addresses are supplied during the high-level time of the clock signal HCK, as shown in FIG. 3C. On the other hand, in the range of 0°–90°, the output of the EX-NOR gate 26 is "1" during the low-level time of the clock signal HCK. Therefore, in the range of 0°–90°, reverse stepping addresses are supplied during the low-level time of the clock signal HCK, as shown in FIG. 3D.

In the range of 90°–180°, the output B1 of the higher 2-bit counter 3 is "1" (FIG. 3A) and, as a result, the output of the EX-NOR gate 26 is "1" during the high-level time of the clock signal HCK. Therefore, in the range of 90°–180°, reverse stepping addresses are supplied during the high-level time of the clock signal HCK, as shown in FIG. 3C. However, when the clock signal HCK is at a low level in the range of 90°–180°, the output of the EX-NOR gate 26 is "0". Accordingly, in the range of 90°–180°, forward stepping addresses are supplied during the low-level time of the clock signal HCK, as shown in FIG. 3D.

In the range of 180°–270°, the output B1 of the higher 2-bit counter 3 is "0" and, as a result, the output of the EX-NOR gate 26 is "0" during the high-level time of the clock signal HCK. Therefore, in the range of 180°–270°, forward stepping addresses are supplied during the high-level time of the clock signal HCK, as shown in FIG. 3C. On the other hand, when the clock signal HCK is at a low level in the range of 180°–270°, the output of the EX-NOR gate 26 is "1". Accordingly, in the range of 180°–270°, reverse stepping addresses are supplied during the low-level time of the clock signal HCK, as shown in FIG. 3D.

In the range of 270°–360°, the output B1 of the higher 2-bit counter 3 is "1" and, as a result, the output of the EX-NOR gate 26 is "1" during the high-level time of the clock signal HCK. Therefore, in the range of 270°–360°, reverse stepping addresses are supplied during the high-level time of the clock signal HCK, as shown in FIG. 3C. However, when the clock signal HCK is at a low level in the range of 270°–360°, the output of the EX-NOR gate 26 is "1". Accordingly, in the range of 270°–360°, forward stepping addresses are supplied during the low-level time of the clock signal HCK, as shown in FIG. 3D.

Sine wave data corresponding to the address supplied to the ROM 1 is outputted from the ROM. Such sine wave data is inputted to a latch circuit 8 during a falling edge of the clock signal HCK. Subsequently the output of the latch circuit 8 is supplied a D flip-flop 9 in synchronization with a rising edge of the clock signal HCK, while the output of the ROM 1 is supplied to a D flip-flop 10.

Accordingly, the sine wave data outputted from the ROM 1 during the high-level time of the clock signal HCK is supplied to the D flip-flop 9. On the other hand, the sine wave data outputted from the ROM 1 during the low-level time of the clock signal HCK is supplied to the D flip-flop 10.

The output of the D flip-flop 9 is supplied to a PWM driver 11, while the output of the D flip-flop 10 is supplied to a PWM driver 12. PWM signals, based on the flip-flops 9 and 10, are formed in the PWM drivers 11 and 12, respectively. The formed PWM signals are respectively coupled to output terminals 15 and 16 for supply to the step motor.

The outputs B1 and B2 of the higher 2-bit counter 3 are respectively supplied to polarity decoders 13 and 14. Polarity signals, as shown in FIGS. 3E and 3F, are respectively formed in the polarity decoders 13 and 14. These polarity signals are respectively coupled to terminals 17 and 18 for supply to the step motor, whereupon currents are caused to flow in the step motor in the directions corresponding to such polarity signals.

Consequently, sine waves having mutually different phases as, for example as shown in FIGS. 3G and 3H, are supplied to the step motor so as to drive the same.

[b] Inverter

Figure 5:
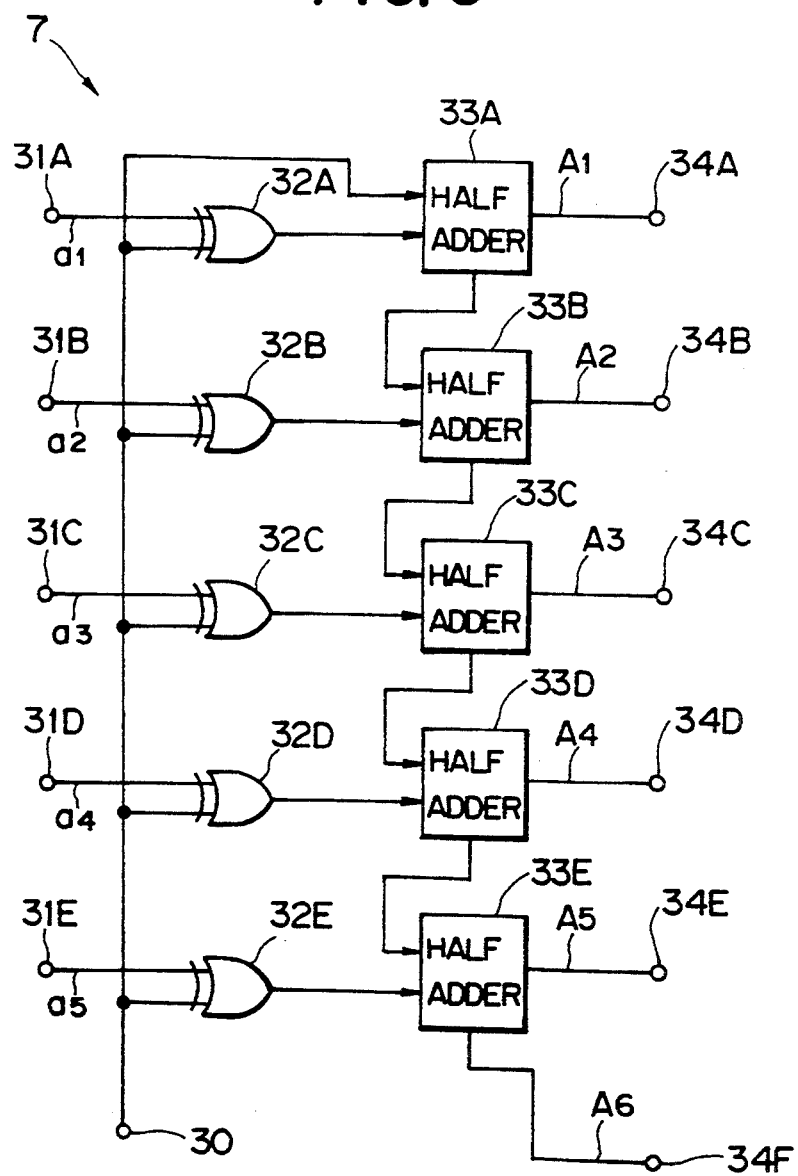
FIG. 5 is a block diagram of an inverter.

A diagram of the inverter 7 for inverting the stepping direction every 90° is shown in FIG. 5.

As shown in FIG. 5, five input address bits a1 through a5 are respectively received at input terminals 31A through 31E and supplied one of the input terminals of EX-OR gates 32A through 32E. Meanwhile, an inverting signal from a terminal 30 is supplied to the other input terminal of each of the EX-OR gates 32A-32E.

The outputs of the EX-OR gates 32A-32E are respectively supplied to one of the input terminals of half adders 33A through 33E, while the inverting signal from the terminal 30 is supplied to the other input terminal of the half adder 33A. A carry from the half adder 33A is supplied to the other input terminal of the half adder 33B. Subsequently, a carry from the half adder 33B is supplied to the other input terminal of the half adder 33C. Likewise, a carry from the half adder 33C is supplied to the other input terminal of the half adder 33D and a carry from the half adder 33D is supplied to the other input terminal of the half adder 33E.

The outputs of the half adders 33A-33E and the carry of the half adder 33E are respectively supplied as address bits A1 through A6 to output terminals 34A through 34F for supply to the ROM 1.

To form forward stepping addresses, the inverting signal received from the terminal 30 is set to "0". As a result, the input address bits a1-a5 from the input terminals 31A-31E are respectively outputted in a substantially unaltered form by way of the EX-OR gates 32A-32E and the half adders 33A-33E.

On the other hand, to form reverse stepping addresses, the inverting signal from the terminal 30 is set to "1" and is supplied to one of the input terminals of each of the EX-OR gates 32A-32E. As a result the individual address bits a1-a5 from the input terminals 31A-31E are respectively inverted by the EX-OR gates 32A-32E. The inverting signal "1" from the terminal 30 is supplied to the half adder 33A, whereby a value "1" is added to the inverted address bits a1-a5 in the half adders 33A-33E, respectively. Thus, the desired addresses are produced by taking the 2's complement. The bits A1-A6 of such address are outputted from the terminals 34A-34F, respectively.

[c] Pulse Removal Setter

In a video signal used in the NTSC system, for example, one frame is composed of 525 lines. Accordingly, each frame has 525 horizontal sync pulses, which number is not equal to a power product of 2. However, in a video camera, when focus control is executed in the vertical period, it is typically desired to have the number of horizontal sync pulses of 1 frame equal to a power product of 2.

For the purpose of meeting such a requirement, the preferred embodiment of the present invention includes the pulse removal setter 5 which is adapted to remove, at substantially equal intervals, some of the clock pulses HCK (horizontal sync pulses) which are to be counted. Due to the operation of the setter 5, the number of counted horizontal sync pulses of 1 frame is reduced to 512, which is a power product of 2.

In the NTSC system in which 1 frame includes 525 horizontal sync pulses, in order to have the number of counted pulses of 1 frame equal to 512, 13 horizontal sync pulses ($525-512=13$) are removed from those to be counted. Removal of 13 pulses at substantially equal intervals can be performed in the following manner.

In a $2^n$ counter whose bit output is a power product of 2, a counted value can be removed every power product of 2. More specifically, in this situation, the power product of 2 closest to 13 is ($2^4=16$). Therefore, substantially uniform removal of 16 pulses from 525 pulses can be executed at a rate of 1 pulse per 32 pulses.

If 16 pulses are removed at a rate of 1 pulse per 32 pulses as previously mentioned, 3 pulses too many are removed since the number of pulses originally needed to be removed is 13. Accordingly, removal of these 3 pulses should be inhibited.

A power product of 2 close to 3 is 4. Therefore, if an operation includes removing 1 pulse per 32 pulses, one operation out of every four operations is not performed. As a result, 1 pulse still needs to be removed. To solve this problem, a pulse removal operation is performed during one of the previously mentioned canceled four operations.

Thus, 13 pulses are removed in a substantially uniformed manner from 525 pulses.

[d] Pulse Removal Setter in the NTSC System

Figure 6:
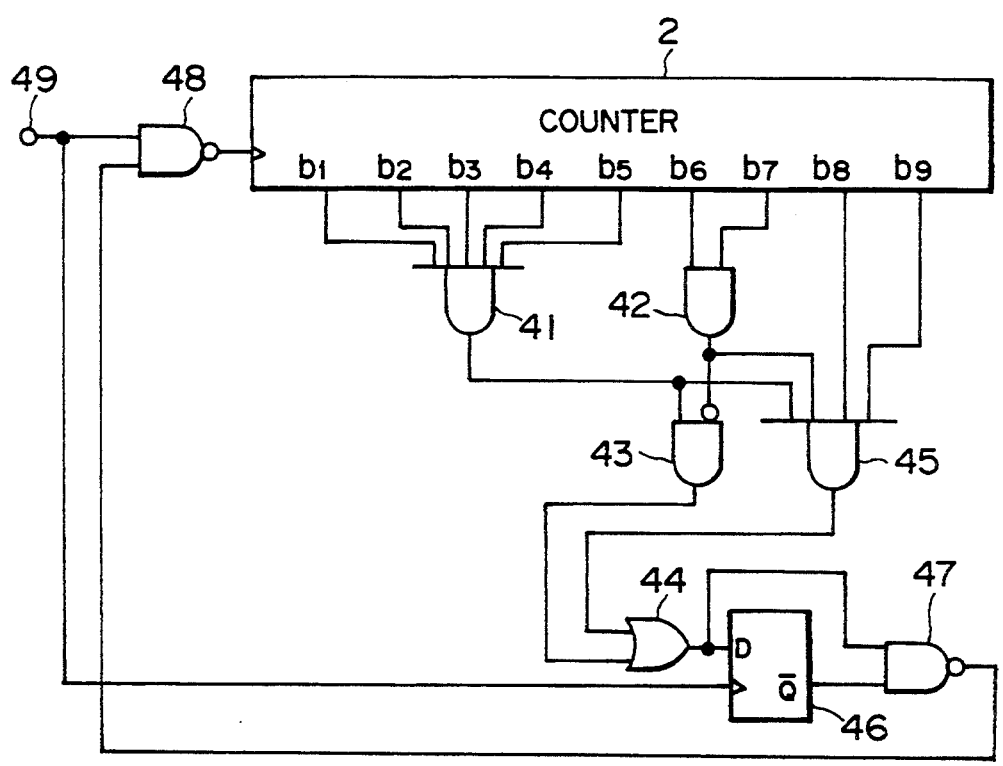
FIGS. 6 and 7 are block diagrams of different pulse removal setters.

FIG. 6 shows a circuit diagram of a pulse removal setter for use in the NTSC system.

As shown in this diagram, bit outputs b1, b2, b3, b4, and b5 of the counter 2 are respectively supplied to the inputs of an AND gate 41. The output of the AND gate 41 is a respectively high value, for example, "1" every 32 pulses. As a result, a removal rate of 1 pulse per 32 pulses is set by the output of the AND gate 41. The output of the AND gate 41 is supplied to one input of an AND gate 43 and an AND gate 45.

Bit outputs b6 and b7 from the counter 2 are respectively supplied to inputs of an AND gate 42, whose output is supplied to another input of AND gate 45. The output of AND gate 42 is also inverted and supplied to another input of the AND gate 43. The inverted output of the AND gate 42 supplied to the AND gate 43 inhibits one of every four removal operations in which, as previously described, each operation removes 1 pulse per 32 pulses. The output of the AND gate 43 is supplied to one input of an OR gate 44.

In addition to the outputs of the AND gates 41 and 42, a bit output b8 and a carry bit output b9 of the counter 2 are also supplied to the AND gate 45, whose output is supplied to another input of the OR gate 44. As a result of supplying the output of the AND gate 45 to the OR gate 44, a pulse removal operation is performed during one of the previously described inhibited operations.

The output of the OR gate 44 is supplied to a D flip-flop 46 and to one input terminal of a NAND gate 47. An inverted output of the D flip-flop 46 is supplied to the other input terminal of the NAND gate 47.

The output of the NAND gate 47 is supplied to one input terminal of a NAND gate 48.

A clock signal is supplied through a clock input terminal 49 to the other input terminal of the NAND gate 48 and to a clock input terminal of the D flip-flop 46. The output of the NAND gate 48 is supplied to the clock input terminal of the counter 2.

[e] Pulse Removal Setter for Use in the NTSC System and PAL System

In the PAL system in which 1 frame includes 625 horizontal sync pulses, in order to have the number of addresses equal to the closest product of 2, that is, ($2^9=512$), 113 pulses (625−512=113) need to be removed. Such removal can be performed by uniformly removing pulses in a manner similar to that previously described. More specifically, the power product of 2 closest to 113 is ($2^7=128$). Therefore, 128 pulses may be removed with an inhibiting or interruption in the removal of 16 of these pulses, and with the further removal of 1 pulse out of such 16 pulses.

Figure 7:
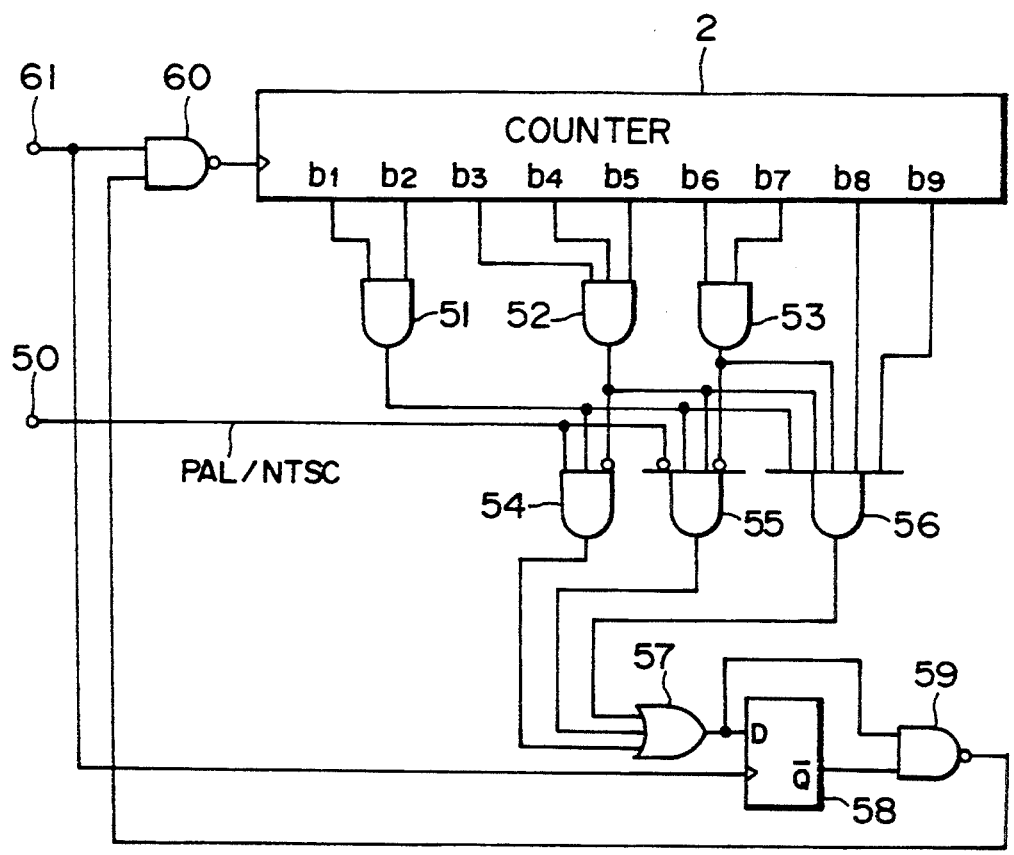

FIG. 7 shows a diagram of a pulse removal setter for use in both the NTSC system and the PAL system. In FIG. 7, bit outputs b1 and b2 of a counter 2 are respectively supplied to inputs of an AND gate 51. Bit outputs b3, b4 and b5 are respectively supplied to inputs of an AND gate 52. Bit outputs b6 and b7 of the counter 2 are respectively supplied to inputs of an AND gate 53.

A switching signal obtained from a terminal 50, the output of the AND gate 51 and an inverted output of the AND gate 52 are supplied to respectively input terminals of an AND gate 54.

An inverted output of the switching signal from the terminal 50, the outputs of the AND gates 51 and 52, and an inverted output of the AND gate 53 are supplied to respective input terminals of an AND gate 55.

The outputs of the AND gates 51, 52 and 53, a bit output b8 of the counter 2, and a carry bit output b9 of the counter 2 are supplied to respective input terminals of an AND gate 56.

The outputs of the AND gates 54, 55 and 56 are supplied to respective input terminals of an OR gate 57.

The output of the OR gate 57 is supplied to a D flip-flop 58 and to one input terminal of a NAND gate 59. The inverted output of the D flip-flop 58 is supplied to the other input terminal of the NAND gate 59.

The output of the NAND gate 59 is supplied to one input terminal of a NAND gate 60.

A clock signal is supplied through a clock input terminal 61 to the other input terminal of the NAND gate 60 and to a clock input terminal of the D flip-flop 58. The output of the NAND gate 60 is supplied to a clock input terminal of the counter 2.

When this pulse removal setter is to be used in the NTSC system, the selection or switching signal obtained from the input terminal 50 is set to a predetermined value, for example, "0". In this case, as mentioned above, 13 pulses are removed in a substantially uniformed manner. On the other hand, when this pulse removal setter is to be used in the PAL system, the selection signal from the input terminal 50 is set to another predetermined value, for example, "1", and, as a result, 113 pulses are removed as previously described in a substantially uniformed manner.

[f] Setting of the Sine Wave Frequency

In the preferred embodiment of the present invention, the counter 2 utilized for generating addresses includes a $2^n$ counter and as a result, its maximum count is equal to a power product of 2. When an address is generated by the use of such $2^n$ counter 2, a desired sine wave frequency can be set by executing a bit shift. More specifically, through the use of 2 clock pulses, the frequency can be set in half by shifting the output of the counter 2 and by 1-bit, thereby causing the address to advance by 1 step. On the other hand, the frequency can be doubled by shifting the output of the counter 2 in the reverse direction.

Figure 8:
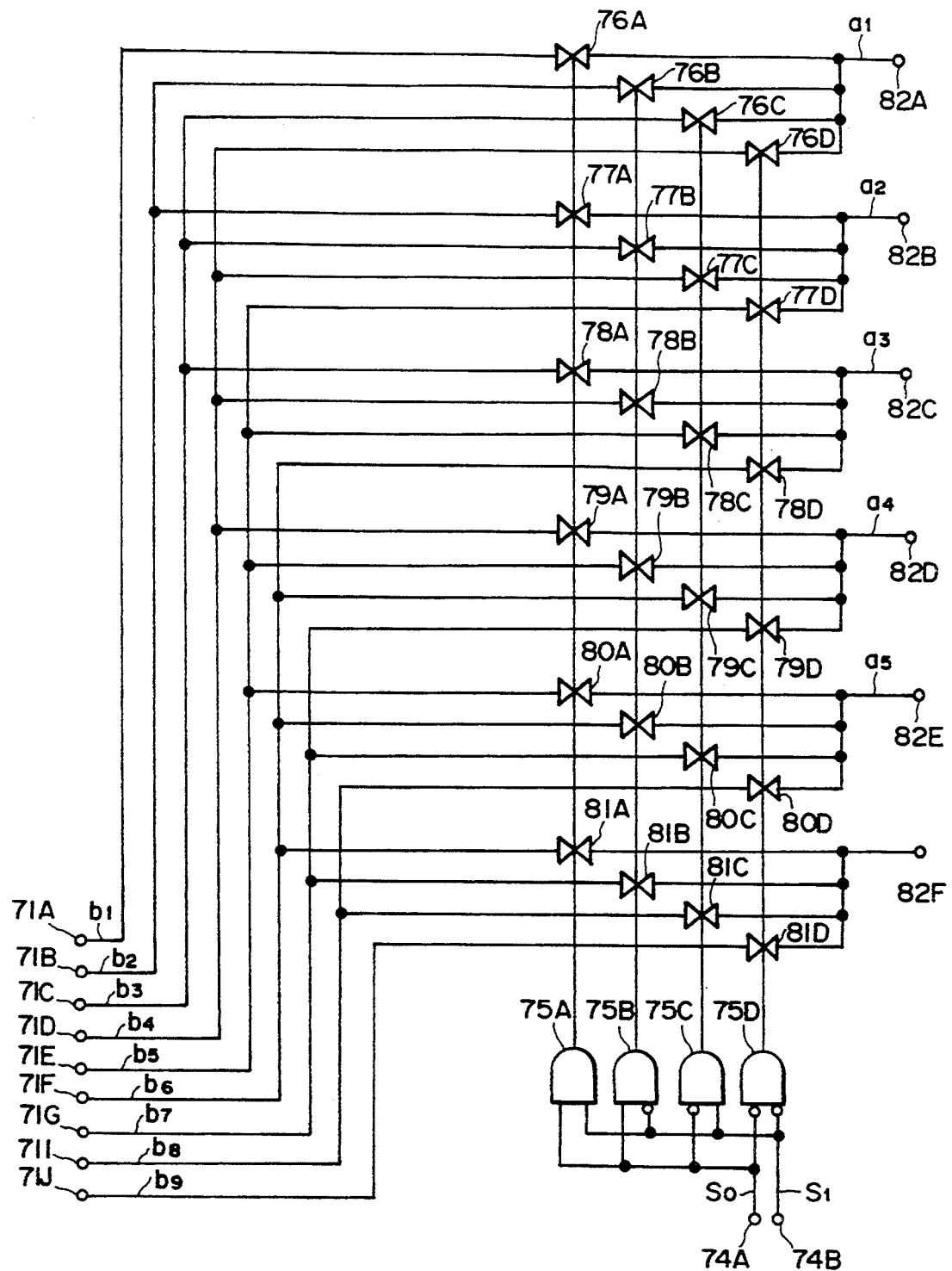
FIG. 8 is a block diagram of a multiplexer.

FIG. 8 shows an example of the construction of the multiplexer 24. In FIG. 8, the 8 bit outputs b1–b8 and the carry bit output b9 of the counter 2 are received at input terminals 71A through 71J respectively.

Two selection signals $S_0$ and $S_1$ are received at input terminals 74A and 74B, respectively. The selection signal $S_0$ from the input terminal 74A is supplied to AND gates 75A and 75B and is inverted and supplied to AND gates 75C and 75D. The other selection signal $S_1$ from the input terminal 74B is supplied to AND gates 75A and 75C and is inverted and supplied to the AND gates 75B and 75D.

When the selection signals $S_0$ and $S_1$ each have a relatively high logic value, for example, "1", the output of the AND gate 75A becomes "1" while the outputs of the AND gates 75B, 75C and 75D become "0". As a result, switch circuits 76A, 77A, 78A, 79A, 80A and 81A are turned on while the other remaining switch circuits, that is, 76B, 76C, 76D, 77B, 77C, 77D, 78B, 78C, 78D, 79B, 79C, 79D, 80B, 80C, 80D, 81B, 81C and 81D, are turned off. In this situation, the bit outputs b1–b6 are received at the input terminals 71A–71F are supplied to output terminals 82A–82F, respectively.

When the selection signal $S_0$ has a value of "1" while the other selection signal $S_1$ has a releatively low logic value, for example, "0", the output of the AND gate 75B becomes "1", while the outputs of the AND gates 75A, 75C and 75D become "0". As a result the switch circuits 76B, 77B, 78B, 79B, 80B and 81B are turned on, while the other switch circuits, which are coupled to AND gates 75A, 75C and 75D, are turned off. In this situation, the bit outputs b2–b7 received at the input terminals 71B–71G are respectively supplied to output terminals 82A–82F, whereby a 1-bit shifted state is attained.

When the selection signal $S_0$ has a value of "0" while the other selection signal $S_1$ has a value of "1", the output of the AND gate 75C becomes "1" while the outputs of the AND gates 75A, 75B and 75D become "0". Accordingly, the switch circuits 76C, 77C, 78C, 79C, 80C and 81C are turned on while the other switch circuits, which are coupled to AND gates 75A, 75B and 75D, are turned off. As a result, the bit outputs b3–b8 received at the input terminals 71C–71I are respectively supplied to output terminals 82A–82F, whereby a 2-bit shifted state is attained.

When the selection signals $S_0$ and $S_1$ each have a value of "0", the output of the AND gate 75D becomes "1", while the outputs of the AND gates 75A, 75B and 75C become "0". Accordingly, the switch circuits 76D, 77D, 78D, 79D, 80D and 81D are turned on, while the other switch circuits, which are coupled to AND gates 75A, 75B and 75C, are turned off. As a result, the bit outputs b4–b9 received at the output terminals 71D–71J are respectively supplied to output terminals 82A–82F, whereby a 3-bit shifted state is attained.

The outputs a1–a5 obtained from the terminals 82A–82E, respectively are supplied to the inverter 7 of FIG. 1. The output from the terminal 82F is supplied as a carry to the higher 2-bit counter 3 of FIG. 1.

[g] Video Camera Construction

Figure 9:
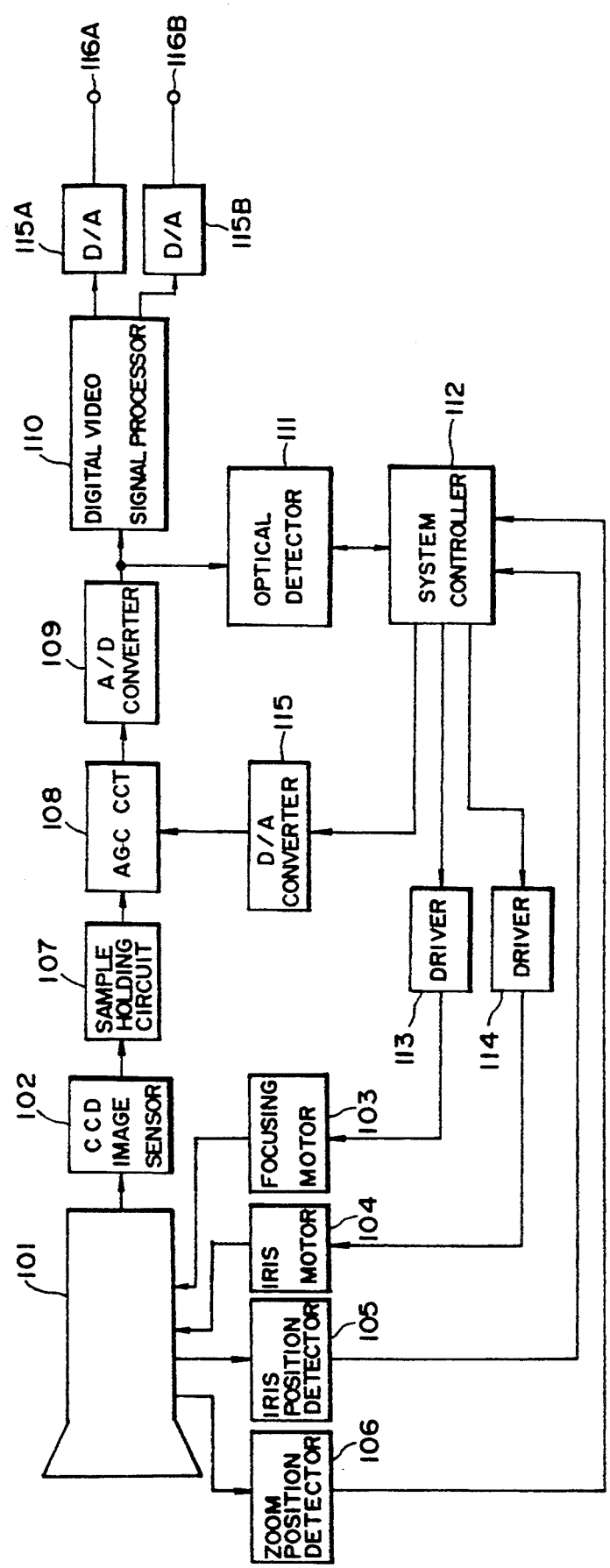
FIG. 9 is a block diagram of video camera utilizing the motor driving circuit of FIG. 1.

The circuit of the present invention is adapted for use in driving a focusing step motor employed in a video camera, for example, the video camera shown in FIG. 9.

In FIG. 9, the image of a subject to be picked up is focused by way of a lens assembly 101 onto a light receiving plane of a CCD image sensor whereupon an image pickup signal is obtained from the CCD image sensor.

Figure 10:
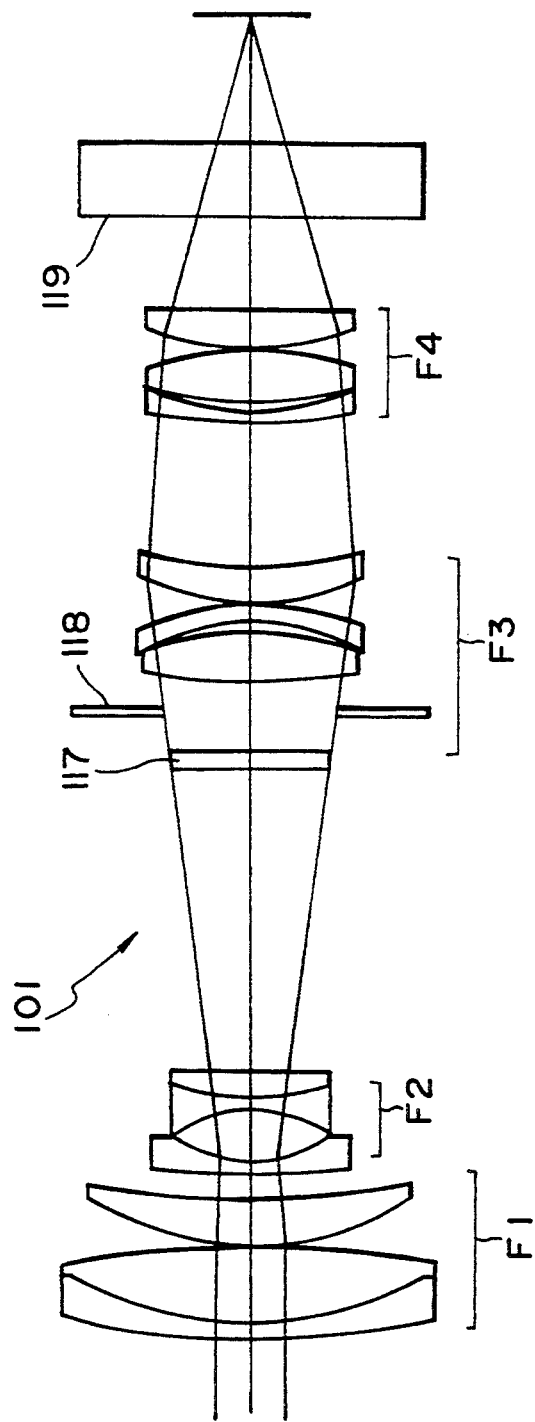
FIG. 10 is a side view of a lens assembly employed in the video camera of FIG. 9.

As illustrated in FIG. 10, the lens assembly 101 includes a fixed lens F1 (1st group lens), a zoom lens F2 (2nd group lens), a fixed lens F3 (3rd group lens) and a focus lens F4 (4th group lens). A PN filter 117 and an iris ring 118 are disposed between the zoom lens F2 and the fixed lens F3. A dummy glass 119 for cutting off infrared rays is disposed adjacent to the focus lens 4.

Focusing is achieved by moving the focus lens F4. The position of the focus lens F4 may be adjusted by using a focusing motor 103, as shown in FIG. 9, which, to facilitate relatively high-precision control, may be a step motor. To reduce vibration and noise, the step motor may be driven by sine waves obtained from a sine wave driver 113 to which the present invention may be applied. The opening/closing action of the iris ring 118 in the lens assembly 101 of FIG. 10 is controlled by an iris driving motor 104 of FIG. 9. The open/closed state of the iris ring 118 is detected by an iris position detector 105 which may include a Hall-effect element or the like. The position of the zoom lens F2 of FIG. 10 is detected by a zoom position detector 106. The outputs of the iris position detector 105 and the zoom position detector 106 are supplied to a system controller 112, as shown in FIG. 9.

The output of the CCD image sensor 102 of FIG. 9 is supplied to a sample holding circuit 107. If the CCD image sensor 102 is supplied with a checkered pixel array of complementary colors, each output signal of the CCD image sensor 102 corresponding to two vertical pixels is sampled and held by the sample holding circuit 107. The output of the sample holding circuit 107 is supplied by way of an AGC (automatic gain control) circuit 108 to an A-D (analog-to-digital) converter 109, in which the output of the CCD image sensor 102 is digitized into, for example, 10-bit data.

The output of the A–D converter 109 is supplied to a digital video signal processor 110 and an optical detector 111. The optical detector 111 is adapted to form an AF (Auto Focus) detection signal for executing auto focus control, an AE (Auto Exposure) detection signal for auto exposure and an AWB (Auto White Balance) detection signal for auto white balance.

The optical detector 111 and the system controller 112 are bidirectionally coupled to each other through a serial interface. Signals may be transferred every vertical period between the optical detector 111 and the system controller 112 by way of such serial interface.

A focus detection area setting signal, an exposure detection area setting signal and a white-balance detection area setting signal are supplied from the system controller 112 to the optical detector 111. The AF detection signal, AE detection signal and AWB detection signal from the optical detector 111 are supplied to the system controller 112.

A lens driving signal is formed in accordance with the AF detection signal and supplied from the system controller 112, by way of the sine wave driver 113 to the focusing motor 103. As a result, the focusing motor 103 positions the focus lens F4 (FIG. 10) at the corresponding focused position.

An iris control signal is supplied from the system controller 112 by way of a driver 114 to the iris driving motor 104. As a result, the iris ring 18 (FIG. 10) is actuated so as to be opened or closed in accordance with an image pickup signal from the CCD image sensor 102. Meanwhile, an AGC signal is supplied from the system controller 112 by way of a digital-to-analog (D/A) converter 115 to the AGC circuit 108, whereupon the gain of the AGC circuit 108 is determined.

The digital video signal processor 110 is adapted to receive the output of the A/D converter 109, as previously described, and to process a luminance signal and a chrominance signal therefrom. The processed luminance and chrominance signals are then respectively converted into analog signals by D-A converters 115A and 115B and supplied to output terminals 116A and 116B.

[h] Auto Focus Control

Focus control for the video camera of FIG. 9 is based on the following principal. That is, the levels of the mid- and high-range components in the luminance signal from the CCD image sensor 102 are rendered maximum at the focused position. Using this principle, the levels of the mid and high-range components within a predetermined focus area in the luminance signal from the CCD image sensor 102 are evaluated by integration, whereupon the focused position is obtained by controlling the position of the focus lens F4 of FIG. 10 such that the evaluated levels become maximum.

More specifically, in the AF detection circuit included in the optical detector 111, the levels of the mid- and high-range components in a predetermined focus area of the image pickup signal from the CCD image sensor 102 are extracted and integrated. The value obtained by integrating such levels is transferred as the AF detection signal every vertical period from the optical detector 111 to the system controller 112.

As previously described, the lens driving signal is formed in accordance with the AF detection signal and supplied from the system controller 112 to the sine wave driver 113. As a result, a PWM signal based on two-phase sine waves having mutually different phases is generated by the sine wave driver 113 in accordance with the lens driving signal, and supplied to the focusing step motor 103, whereupon the step motor is rotated in accordance with such two-phase PWM signal.

In the system controller 112, control is executed so as to detect the lens position at which the AF detection signal, obtained per vertical period, becomes a maximum. The focusing step motor 103 is brought to a halt at this detected lens position.

[i] Control of the Focusing Step Motor

As previously described, the sine wave driver 113 for driving the focusing step motor 103 may be constructed as shown in FIG. 1.

Figure 11:
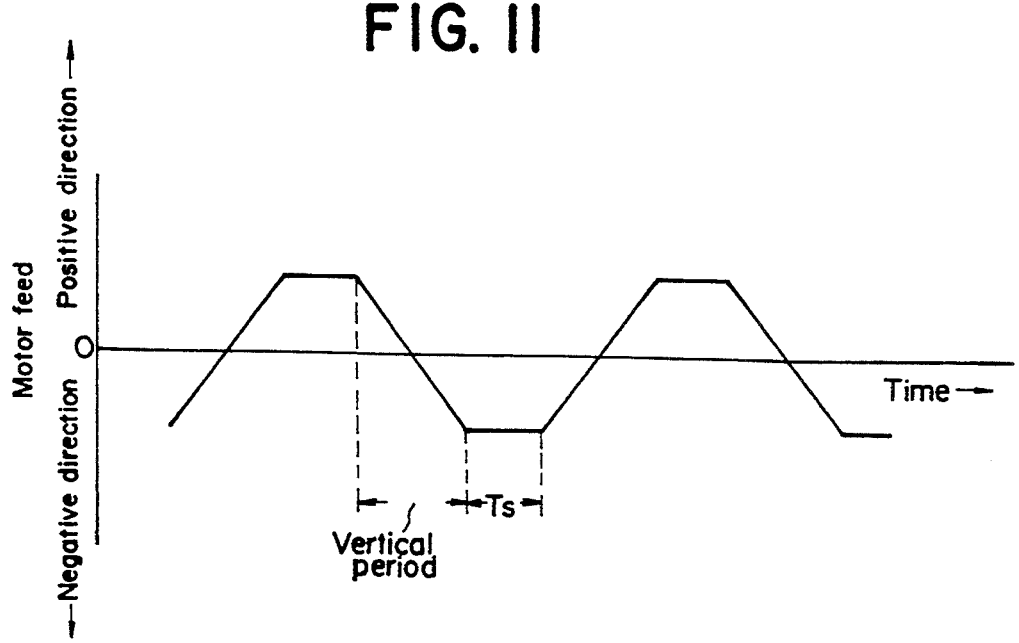
FIG. 11 is a timing chart to which reference will be made in explaining a motor control operation.

When auto focus control is executed in response to the AF detection signal obtained every vertical period, as described above, the focusing step motor 103 is brought to a halt every vertical period as shown in FIG. 11. The AF detection signal is received during the time Ts in which the focusing step motor 103 is brought to a halt. The corresponding amount of movement is calculated, and the focusing step motor 103 is then driven in accordance with such amount.

Figure 12:
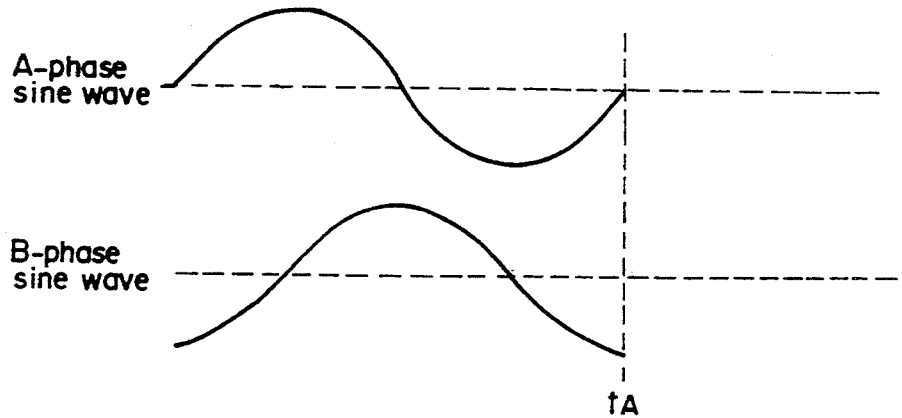
FIG. 12 is a waveform chart to which reference will be made in explaining the control action for stopping of the motor rotation.

As previously described, in the sine wave driver 113 of FIG. 1, the pulse removal setter 5 is provided so that the value obtained by counting horizontal sync pulses of 1 frame in the counter 2 is rendered equal to a power product of 2, for example, 512. As a result, the AF detection signal which is transmitted every vertical period causes the motor 103 to be stopped exactly at a detent position. As an example, if the focusing step motor 103 is to be stopped at a time $t_A$, as shown in FIG. 12, during the time of 1 frame, the motor 103 may be brought to a halt when the phase-A sine wave becomes 0° which corresponds to the detent position. As a result control can be achieved.

A relatively high torque is normally required for starting the rotation of the focusing step motor 103. However, once the motor 103 is rotating, such high torque is normally no longer necessary. Therefore, the driving circuit is configured such that, when rotation of the focusing step motor 103 is to be started, sine waves having a relatively large amplitude are supplied thereto so as to exert a sufficiently high torque, and upon rotation of the motor 103, the amplitude of the sine waves supplied thereto is reduced to a smaller value so as to reduce the power consumption.

In the sine wave driver 113 of FIG. 1, sine wave data having mutually different amplitudes may be stored in four data tables of the ROM 1. The sine wave amplitude can be changed by selectively switching the tables in the ROM 1 in response to the switching signal obtained from the terminal 21. Such selective switching of the sine wave amplitude is executed when the focusing step motor 103 is at a detent position, so as to maintain smooth rotation of the motor 103.

Figure 13:
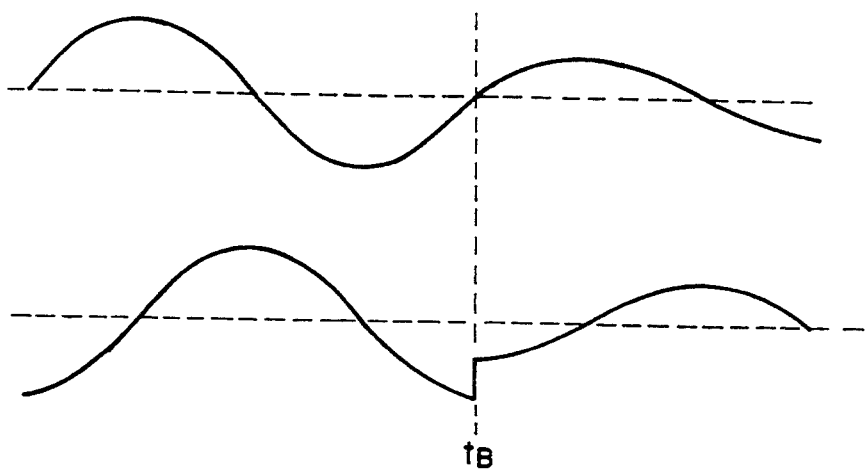
FIG. 13 is a waveform chart to which reference will be made in explaining the changing of the sine wave amplitude.
Figure 14:
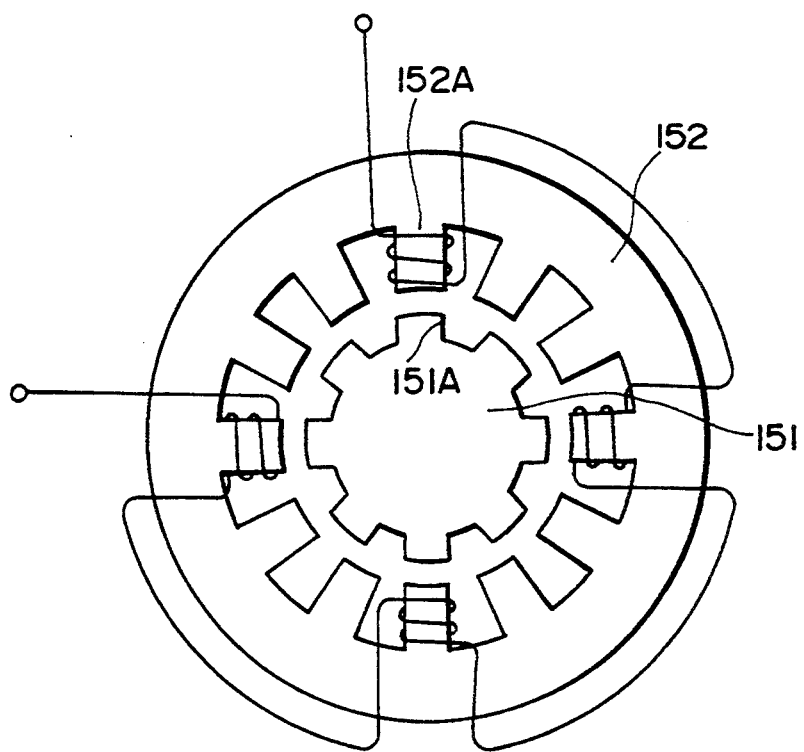
FIG. 14 is a schematic diagram for to which reference will be made in explaining a conventional step motor.

More specifically, when the focusing step motor 103 is started, phase-A and phase-B sine waves having a relatively large amplitude as, for example, those shown in FIG. 13, are selected. At a time $t_B$, that is, the time when the phase-A sine wave becomes 0° immediately after the rotation of the focusing step motor 103 has started, the amplitudes of the phase-A and phase-B sine waves are switched to those having a smaller amplitude. Since the sine wave amplitude is selectively switched at the detect position of the motor 103, smooth rotation of the motor 103 is maintained.

According to the above-described embodiment of the present invention, an address numerically equal to a power product of 2 is generated per frame from the counter 2 due to the pulse removal setter 5, and sine waves of 1 frame are read out from the ROM 1 in accordance with the power product of 2. Since an address equal to a power product of 2 is generated per frame from the counter 2, when auto focus control is executed by receiving the data every vertical period, the step motor may be stopped at a detent position. Furthermore, as an address numerically equal to a power product of 2 is generated from the counter 2 in the manner described above, a desired motor-driving sine wave frequency is settable by bit-shifting the output of the counter 2 in the multiplexer 4.

Furthermore, the pulse removal setter 5 removes a predetermined number of the horizontal sync pulses in a substantially uniform manner such that the counted value of the horizontal sync pulses of 1 frame becomes equal to a power product of 2. Therefore, a $2^n$ counter can be employed as the counter 2 for generating addresses, and the driving sine wave frequency is easily changeable by bit shifting, as previously described.

At the time of starting the focusing step motor 103, sine waves having relatively large amplitudes are supplied thereto so as to obtain a sufficiently high torque and, upon rotation of the motor 103, sine waves having smaller amplitudes are selectively supplied to the motor so as to reduce the power consumption.

As previously mentioned, a plurality of data tables, for example, four data tables, may be created in the ROM 1 for respectively storing therein sine wave data having mutually different amplitudes. By selectively switching such tables, in response to a switching signal received from the terminal 21, the sine wave amplitude can be changed as desired. Such changeover of the sine wave amplitude is executed when the phase-A sine wave becomes 0°, that is, when the focusing motor is at a detent position, so as to maintain smooth rotation of the motor.

Furthermore, the address stepping direction may be inverted every 90° in the inverter 7, so that sine waves of 1 frame can be generated from sine wave data representing a phase-angle span of only 90°, hence minimizing the required memory capacity of the ROM 1 of FIG. 1.

The state of the inverter 7 is switched between the high-level and the low-level durations of the clock pulses HCK, such that two-phase sine waves having mutually different phases are obtained in a time division manner. Consequently, two series of sine waves can be produced by a single ROM and address generator, thereby reducing the amount of hardware needed.

Although a preferred embodiment of the present invention has been described in detail herein with reference to the accompanying drawings, it is to be understood that this invention is not limited to that precise embodiment, and that a variety of changes and modifications can be effected therein by one skilled in the art without departing from the scope or spirit of the present inventive invention as defined in the appended claims.

What is claimed is:

1. A motor driving circuit for generating sine wave signals for driving a step motor, said circuit comprising:
    memory means for storing sine wave data at respective addresses therein;
    address generator means for generating address signals having a plurality of bits for accessing corresponding addresses in said memory means for a predetermined portion of a frame in a vertical period;
    bit shifter means for bit-shifting said address signals from said address generator means and thereby setting a desired frequency;
    means for counting carry bit data generated by said bit shifter means to generate polarity signals; and
    means for reading the sine wave data stored at the accessed addresses in said memory means and for processing the read sine wave data and the polarity signals to form sine wave driving signals having said desired frequency for driving the step motor.

2. A motor driving circuit for generating sine wave signals for driving a step motor, comprising:

memory means for storing sine wave data at respective addresses therein, said memory means having stored therein a plurality of data tables containing a plurality of sine wave data, each of said data tables having a respectively different amplitude value;

address generator means for generating address signals having a plurality of bits for accessing corresponding addresses in said memory means for a predetermined portion of a frame in a vertical period;

bit shifter means for bit-shifting said address signals from said address generator means and thereby setting a desired frequency; and means for reading the sine wave data stored at the accessed addresses in said memory means and for processing the read sine wave data so as to form sine wave driving signals having said desired frequency for driving the step motor.

3. A motor driving circuit according to claim 2, in which said memory means further includes means for receiving a switching signal, and in which one of said data tables is selected in response to said switching signal so as to select a desired sine wave amplitude.

4. A motor driving circuit according to claim 3, wherein the sine wave amplitudes are switched when said step motor is at a detent position.

5. A motor driving circuit for generating sine wave signals for driving a step motor, said circuit comprising:

input means for receiving a predetermined number of horizontal sync pulses in each of a succession of frame periods;

memory means for storing sine wave data at respective addresses therein;

pulse removal means for removing a predetermined number of said horizontal sync pulses at substantially equal intervals during each of said frame periods so that the remaining number of said horizontal sync pulses per frame becomes a power product of 2;

address generator means counting said remaining number of horizontal sync pulses for generating address signals accessing corresponding addresses in said memory means; and means for reading the sine wave data stored at the accessed addresses in said memory means and for processing the read sine wave data so as to form sine wave signals for driving the step motor.

6. A motor driving circuit for generating sine wave signals for driving a step motor, said circuit comprising:

input means for receiving a predetermined number of clock pulses in each of a succession of frame periods;

memory means for storing sine wave data at respective addresses therein corresponding to a quarter frame period;

address generator means counting said predetermined number of clock pulses for generating address signals accessing in a predetermined order corresponding addresses in said memory means;

inverter means for inverting the order in which said addresses are accessed in each of the quarter frame periods; and means for reading the sine wave data stored at the accessed addresses in said memory means in the order set forth by said inverter means and for processing the read sine wave data so as to form sine wave signals for driving the step motor.

7. A motor driving circuit for generating sine wave signals for driving a step motor, said circuit comprising:

input means for receiving a predetermined number of clock pulses having time durations of alternating high level and low level states in each of a succession of frame periods;

memory means for storing a plurality of sine wave data having respective amplitudes at respective addresses therein corresponding to a quarter frame period;

address generator means counting said predetermined number of said clock pulses for generating generating address signals accessing in a predetermined order corresponding addresses in said memory means;

inverter means for inverting the order in which said addresses are accessed during each of the quarter frame periods in accordance with the state of the current clock pulse; and means for reading the sine wave data stored at the accessed addresses in said memory means in the order set forth by said inverter means and for processing the read sine wave data so as to form sine wave signals having respective phases for supply to the step motor so as to drive the same.

8. A motor driving circuit according to claim 7, in which said memory means includes means for receiving a switching signal, and in which amplitudes of the sine wave signals are switched when the phase of one of the sine wave signals becomes 0° which corresponds to a detent position of said step motor.

9. A motor driving circuit according to claim 7, in which each of the plurality of sine wave data stored in said memory means represents a phase-angle span of 90°.

10. A motor driving circuit for generating sine wave signals for driving a step motor, said circuit comprising:

memory means for storing a plurality of sine wave data having respective amplitudes in respective addresses therein;

address generator means for generating address signals accessing corresponding addresses in said memory means; and means for reading the sine wave data stored at the accessed addresses in said memory means and for processing the read sine wave data so as to form sine wave signals for driving the step motor, sine wave data having a relatively large amplitude being read out from said memory means at the start of rotation of said step motor and, after said step motor has started rotating, sine wave data of smaller amplitude are read out from said memory means when a predetermined phase angle of the sine wave data is obtained.

11. A motor driving circuit according to claim 1, wherein said polarity signals determine a direction of current flow in the step motor, and said means for reading and processing the sine wave data forms pulse width modulation (PWM) signals derived from said sine wave data.

* * * * *